US007359529B2

(12) United States Patent
Lee

(10) Patent No.: US 7,359,529 B2
(45) Date of Patent: Apr. 15, 2008

(54) IMAGE-DETECTABLE MONITORING SYSTEM AND METHOD FOR USING THE SAME

(75) Inventor: Hyeok-beom Lee, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 697 days.

(21) Appl. No.: 10/774,469

(22) Filed: Feb. 10, 2004

(65) Prior Publication Data

US 2004/0183951 A1 Sep. 23, 2004

(30) Foreign Application Priority Data

| Mar. 6, 2003 | (KR) | ...................... 10-2003-0014105 |
| Apr. 15, 2003 | (KR) | ...................... 10-2003-0023791 |

(51) Int. Cl.
*G06K 9/00* (2006.01)
(52) U.S. Cl. ...................................... 382/103; 382/118
(58) Field of Classification Search ................ 348/143, 348/152
See application file for complete search history.

(56) References Cited

U.S. PATENT DOCUMENTS

| 6,927,694 | B1 * | 8/2005 | Smith et al. ................. 340/576 |
| 2002/0190119 | A1 | 12/2002 | Huffman ...................... 235/375 |
| 2003/0071908 | A1 * | 4/2003 | Sannoh et al. .............. 348/345 |
| 2003/0142209 | A1 * | 7/2003 | Yamazaki et al. ........... 348/143 |
| 2004/0017930 | A1 * | 1/2004 | Kim et al. ................... 382/103 |
| 2004/0208114 | A1 * | 10/2004 | Lao et al. .................... 369/125 |
| 2005/0094849 | A1 * | 5/2005 | Sung et al. .................. 382/103 |
| 2006/0198554 | A1 * | 9/2006 | Porter et al. ................ 382/159 |
| 2007/0130599 | A1 * | 6/2007 | Monroe ....................... 725/105 |

FOREIGN PATENT DOCUMENTS

EP 1260934 11/2002

OTHER PUBLICATIONS

Hongo, H. et al., "Face and Hand Gesture Recognition for Human-Computer Interaction", Sep. 3, 2000, Pattern Recognition Proceedings, 15th International Conference, Los Alamitos, CA.
Acosta, A. et al., "An Automatic Face Detection and Recognition System for Video Indexing Applications", May 13, 2002, 2002 IEEE International Conference on Acoustics, Speech and Signal Processing, Orlando, FL.

(Continued)

*Primary Examiner*—Matthew C. Bella
*Assistant Examiner*—Claire Wang
(74) *Attorney, Agent, or Firm*—Roylance, Abrams, Berdo and Goodman, LLP

(57) ABSTRACT

A monitoring system and method is provided that can detect and capture an image at a monitored position as an analog video signal, and in response, convert the analog video signal into a digital video signal for enlargement, analysis and storage of detected facial images therein. The system includes a candidate area detection unit for comparing a color difference signal level of the converted digital video signal with a reference range, a control unit for outputting a zooming control signal and a face detection unit for detecting a face video signal from the enlarged images. A compression/recording unit is provided for then compressing and recording the detected face image video signal, and allowing a user to easily perform a search for a subject's face when searching recorded video data.

15 Claims, 3 Drawing Sheets

OTHER PUBLICATIONS

Albiol, A. et al., "A Simple and Efficient Face Detection Algorithm for Video Database Applications", Sep. 10, 2000, Image Processing Proceedings of the 7th International IEEE Conference.

Kruger, V. et al., "Gabor Wavelet Networks for Efficient Head Pose Estimation", Sep. 11, 2000, Image and Vision Computing, Proceedings of the 11th British Machine Vision Conference, Bristol, UK.

Zhengyou, Z. et al., "Comparison Between Geometry-Based and Gabor-Wavelets-Based Facial Expression Recognition Using Multi-Layer Perception", Apr. 14, 1998, Proceedings of the 3rd IEEE International Conference on Automatic Face and Gesture Recognition, Nara, Japan.

Garcia, C. et al., "Face Detector in Color Images using Wavelet Packet Analysis", Jun. 7, 1999, IEEE International Conference on Multimedia Computing and Systems, 1999.

Byun, H. et al., "Robust Face Detection and Tracking for Real Life Applications", Sep. 2003, International Journal of Pattern Recognition and Artificial Intelligence.

* cited by examiner

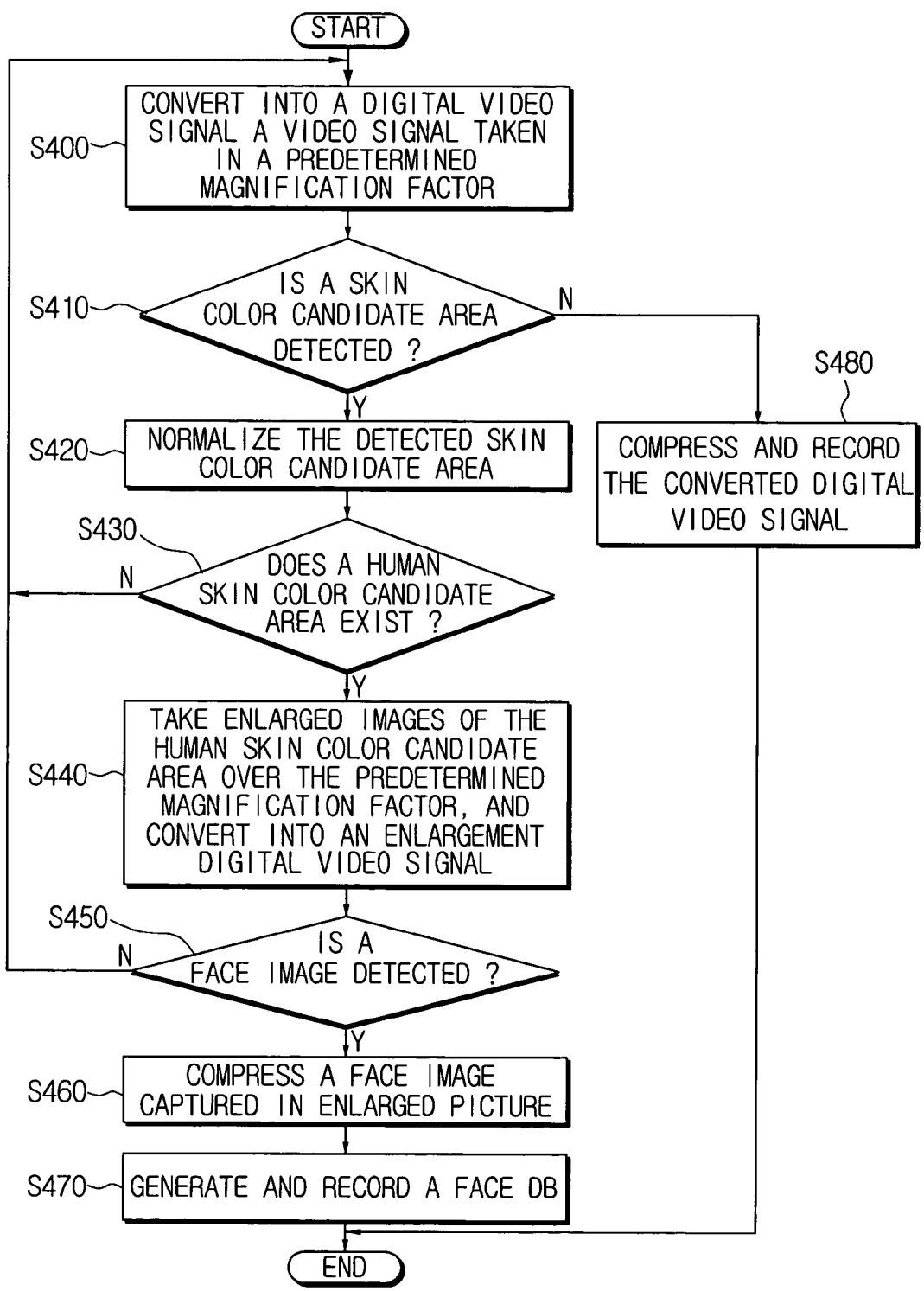

IMAGE-DETECTABLE MONITORING SYSTEM AND METHOD FOR USING THE SAME

CROSS-REFERENCE TO RELATED APPLICATIONS

This application claims the benefit of Korean Patent Application No. 2003-23791, filed Apr. 15, 2003 and Korean Patent Application No. 2003-14105, filed Mar. 6, 2003, in the Korean Intellectual Property Office, the disclosure of which is incorporated herein by reference.

BACKGROUND OF THE INVENTION

1. Field of the Invention

The present invention relates to an image-detectable monitoring system and a method for using the same, and more particularly, to a human face image-detectable monitoring system and method that is capable of detecting, enlarging, and capturing a subjects' facial images, compressing the images for records and storage, and thereafter allowing searching and retrieving of the compressed and recorded images.

2. Description of the Related Art

The next generation closed-circuit TV (CCTV) system is a monitoring system having at least one monitoring camera installed at monitoring spots where security is required, and a display for displaying the images taken by the installed monitoring camera in real time. The display is provided on monitors installed at certain places to enable fewer monitoring personnel to observe both usual and unusual situations at the monitoring spots.

Furthermore, the CCTV system records an image signal, such as a video signal taken through the monitoring system on a recording medium, and reproduces and displays the recorded video signal on monitors. A digital video recorder (DVR) system can be an example of one such CCTV system component.

The DVR system captures an analog video signal input from a monitoring camera, and compresses and records the analog video signal on a hard disc drive (HDD) as a high-definition digital video signal. Thus, the captured video signal can be recorded and maintained for a greater period without image quality deterioration so that it can be used in cases that require securing exhibits or searches in the future.

Such a conventional CCTV system uses at least one fixed monitoring camera to monitor and/or record positions where monitoring is necessary. It is impossible however, for the fixed monitoring camera to rotate beyond the fixed direction, therefore it captures images only for a specific spot at the installed position, and often covers and captures images within a wide area rather than a specific, or more narrow part of the monitoring spot. Accordingly, a video signal for the wide area of a monitoring spot has lesser image quality when compared to a video signal taken for a specific part of the monitoring spot, causing difficulties in exactly identifying a subject within the image. That is, since the monitoring camera captures images of both a subject and surroundings rather than images specific to the subject in the monitoring spot, the subject's face is recorded as relatively small so that it is difficult to identify the face and which causes difficulties in securing clear exhibits or evidence for future use.

Furthermore, the conventional CCTV system has a lower recording space efficiency level since it records all video signals taken of subjects and surroundings. Having recorded such a large amount of information, the conventional CCTV system requires a long time to search for a desired video signal.

Accordingly, a need exists for a monitoring system and a method that is capable of detecting and recording facial images from a monitored position, excluding surroundings, such that the images are more useful and the analysis, storage and retrieval of images is achieved in an efficient manner.

SUMMARY OF THE INVENTION

Therefore an object of the present invention is to provide a monitoring system and method for detecting and recording specific images, such as facial images from a monitored position, and excluding surroundings from the images such that the images are more useful for various purposes, such as identification.

Another object of the present invention is to provide a monitoring system and method for analysis, storage and retrieval of images in an efficient manner These and other objects are substantially achieved by providing a monitoring system and method that can detect and capture facial images at a monitored position as an analog video signal, and in response, convert the analog video signal into a digital video signal for enlargement, analysis and storage of the facial image. The monitoring system comprises a candidate area detection unit for comparing a color difference signal level of the converted digital video signal with a reference color difference signal level range that is predetermined for a skin color decision, and in response, detecting at least one skin color candidate area.

The monitoring system further comprises a control unit for outputting a zooming control signal to the image-capturing unit to capture enlarged images of each detected skin color candidate area. A conversion unit is provided for converting each skin color candidate area captured in the enlarged image into an enlargement digital video signal for use with a face detection unit for detecting a face video signal from the converted enlargement digital video signal. A compression/recording unit is then provided for compressing and recording the detected face image video signal.

The system scans for candidate areas and once found, directs the capture of enlarged images. If a facial image is detected in these enlarged images, the enlarged facial image is recorded for use. Accordingly, the system and method enables a user to easily perform a search for a subject's face when searching recorded video data.

BRIEF DESCRIPTION OF THE DRAWINGS

The invention will be described in detail with reference to the following drawings in which like reference numerals refer to like elements, and wherein:

FIG. 4 is a flow chart illustrating an example of a face image detection method for a monitoring system as shown in FIG. 1.

DETAILED DESCRIPTION OF THE PREFERRED EMBODIMENTS

Hereinafter, the present invention will be described in detail with reference to the attached drawings.

Figure 1:
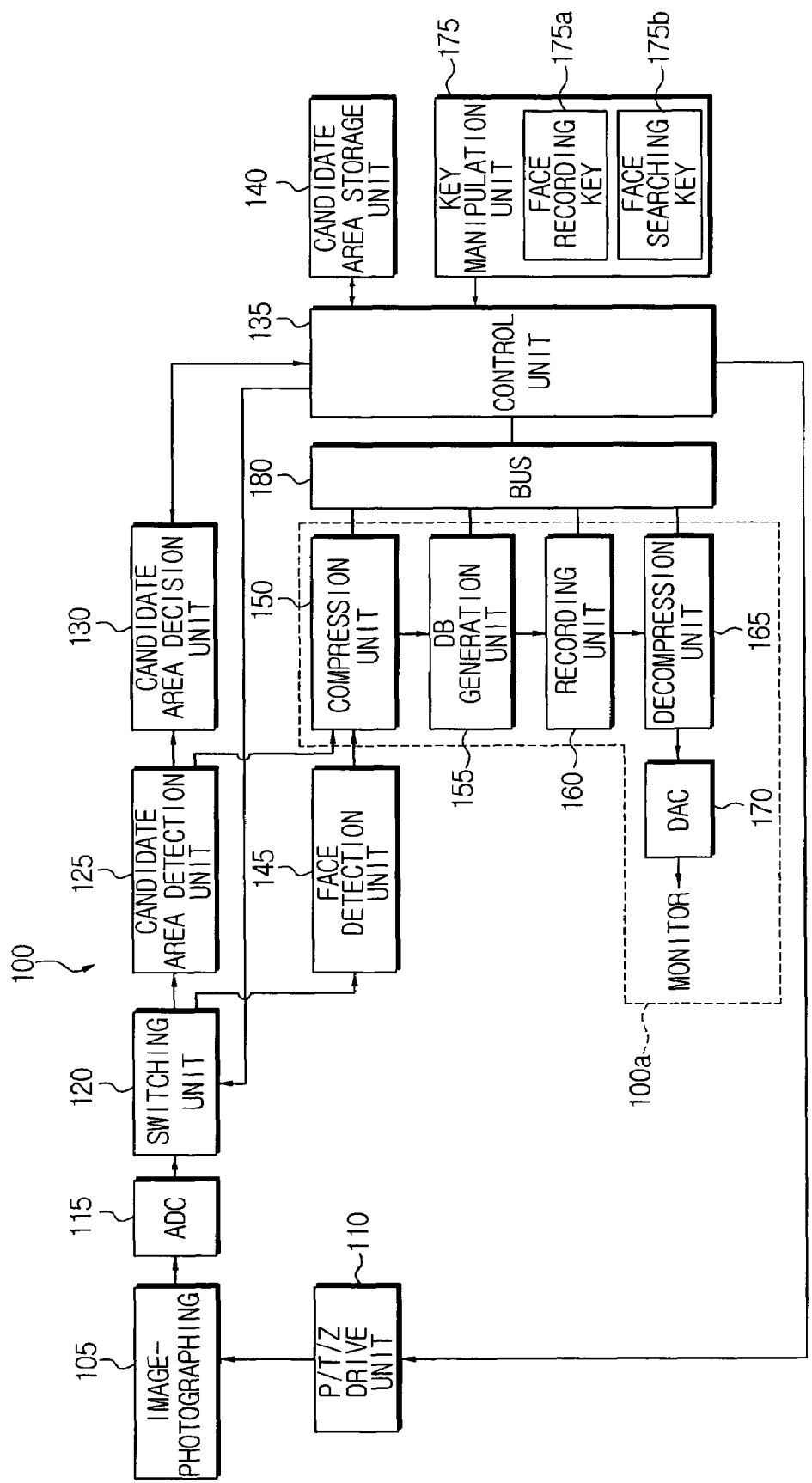
FIG. 1 is a block diagram showing an example of a facial image monitoring system according to an embodiment of the present invention.
Figure 2:
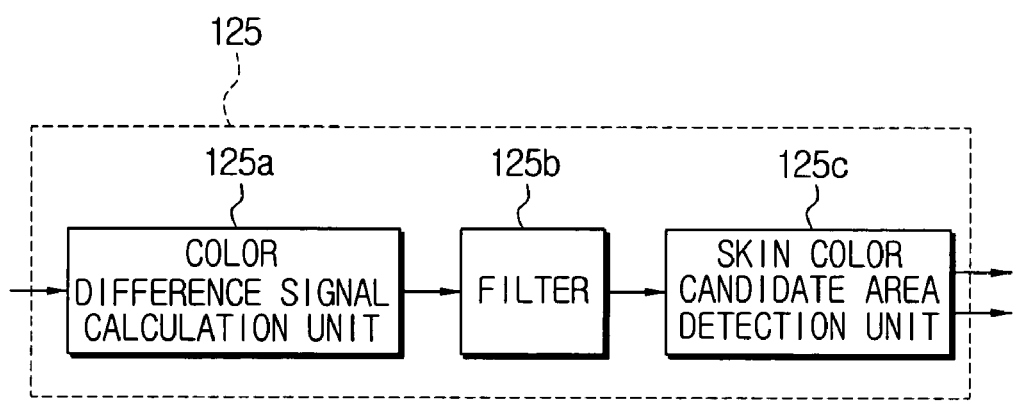
FIG. 2 is a block diagram showing an example of a candidate area detection unit of FIG. 1 in detail.
Figure 3:
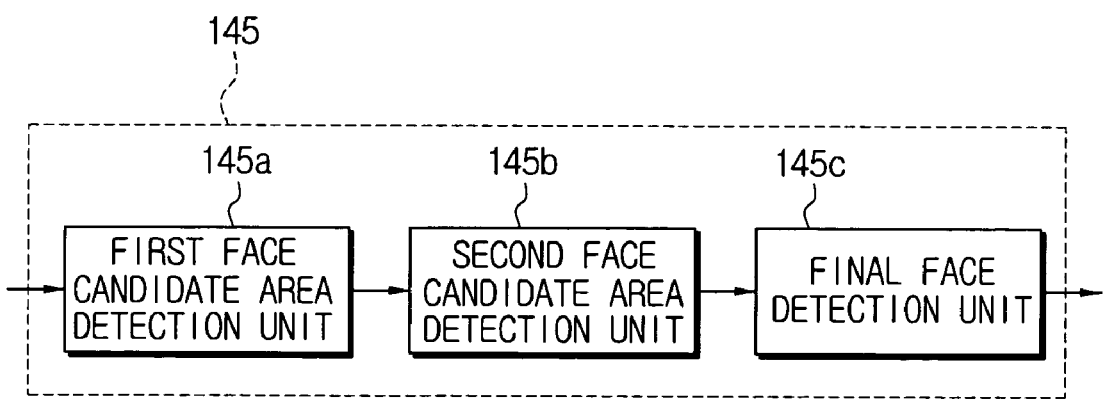
FIG. 3 is a block diagram showing an example of a face detection unit of FIG. 1 in detail.

FIG. 1 is a block diagram showing an example of a facial image monitoring system according to an embodiment of the present invention, FIG. 2 is a block diagram showing an example of a candidate area detection unit of FIG. 1 in detail, and FIG. 3 is a block diagram showing an example of a face detection unit of FIG. 1 in detail.

Referring to FIG. 1, an example of face image monitoring system 100 according to an embodiment of the present invention has a image-photographing unit 105, a pan/tilt/zoom drive unit (hereinafter, referred to as "P/T/Z drive unit") 110, an analog/digital conversion unit (hereinafter, referred to as "ADC") 115, a switching unit 120, a candidate area detection unit 125, a candidate area decision unit 130, a control unit 135, a candidate area storage unit 140, a face detection unit 145, a compression unit 150, a database (hereinafter, referred to as "DB") generation unit 155, a recording unit 160, a decompression unit 165, a digital/analog conversion unit (hereinafter, referred to as "DAC") 170, and a key manipulation unit 175. A bus 180 is provided for coupling the control unit 135, compression unit 150, database generation unit 155, recording unit 160 and decompression unit 165.

The image-photographing unit 105 is a camera device, such as a charge coupled device (CCD) camera driven by the P/T/Z drive unit 110 to capture images of predefined monitoring spots. The CCD camera can pan in a horizontal direction, tilt in a vertical direction, zoom in and out, and output an analog video signal taken by the CCD camera. A plurality of image-photographing units 105 can be installed and each of which can have an identification number.

In the embodiment of the present invention shown in FIG. 1, one image-photographing unit 105 is used to capture images of at least one monitoring spot. However, in the case of two or more monitoring spots, the single image-photographing unit 105 can repeat image capturing operations at first one predefined monitoring spot for a predetermined period of time, and then move to a second monitoring spot to capture images for a predetermined period of time, and so forth for any number of monitoring spots. For example, where the monitoring system 100 is installed in a bank and captures images of three bank windows through one image-photographing unit 105, the image-photographing unit 105 captures images of one bank window at a fixed state for a predetermined period of time, moves to a position where it can capture images of a next bank window for a predetermined period of time, and then moves to a position where it can capture images of the next teller's spot for a predetermined period of time. In this example, it is preferable that the predetermined period of time for capturing images of each teller's spot is the same, however this can be configured as required by the application.

Returning to FIG. 1, the P/T/Z drive unit 110 drives the image-photographing unit 105 based on driving control signals, for example, a zooming control signal, a pan/tilt position control signal, and so forth, output from the control unit 135 described in greater detail below.

To do so, the P/T/Z drive unit 110 includes a zooming drive unit (not shown) for driving a zoom lens (not shown) to capture enlarged images of a candidate area based on a zooming control signal. The P/T/Z drive unit 110 further includes a pan/tilt drive unit (not shown) for driving the image-photographing unit 105 to move to positions where it can capture images of candidate areas based on a position control signal.

The ADC 115 converts the analog video signal provided by the image-photographing unit 105 into a digital video signal for monitoring spots that are image-captured through the image-photographing unit 105.

The switching unit 120 selectively provides the digital video signal output from the ADC 115 to either the candidate area detection unit 125 or the face detection unit 145, and is preferably implemented by a multiplexer. The switching unit is configured to provide the digital video signal output from the ADC 115 to the candidate area detection unit 125 initially. Further operation of the system 100 results in an enlargement digital video signal which is provided to the face detection unit 145 as described in greater detail below.

The candidate area detection unit 125 uses a color difference signal provided by the digital video signal output from the switching unit 120 to detect at least one skin color candidate area consisting of a color difference signal similar to a color difference signal for a human skin color.

To do this, the candidate area detection unit 125 has a color difference signal calculation unit 125a, a filter 125b, and a skin color candidate area detection unit 125c, as shown in FIG. 2.

The color difference signal calculation unit 125a digitizes the color difference signal level of a digital video signal input from the switching unit 120 by using Equation (1) below.

$$f(Cb, Cr) = \begin{pmatrix} 0, \text{ if } (Cb_L < Cb < Cb_H) | (Cr_L < Cr < Cr_H) \\ 255, \text{ otherwise} \end{pmatrix} \quad (1)$$

Referring to Equation (1), '$Cb_L<Cb<Cb_H$' and '$Cr_L<Cr<Cr_H$' is a reference color difference signal level range predetermined for a skin color decision. In Equation (1), Cb and Cr denote color difference signal levels of digital video signals input from the switching unit 120, $Cb_L$ and $Cr_L$ are minimum values of the reference color difference signal level, and $Cb_H$ and $Cr_H$ are maximum values of the reference color difference signal level, respectively.

The color difference signal calculation unit 125a compares the color difference signal level of the digital video signal input frame by frame, (i.e. Cb and Cr) with the reference color difference signal level range predetermined for the skin color decision (i.e. $Cb_L$, $Cr_L$, $Cb_H$ and $Cr_H$), and digitizes the video signal based upon the results.

Specifically, the color difference signal calculation unit 125a digitizes the digital video signal from the switching unit 120 to a color difference signal level of '0' when the color difference signal level of the digital video signal is within the predetermined reference color difference signal level range as in Equation (1), and digitizes the digital video signal to a color difference signal level of '255' when the color difference signal level of the digital video signal is excluded from the predetermined reference color difference level range.

The filter 125b then filters the digitized digital video signal to remove noise included in the digitized digital video signal.

The skin color candidate area detection unit 125c then performs vertical and horizontal projections for the filtered digital video signal to detect at least one skin color candidate area.

For example, the vertical projection is used to count the number of pixels, that is, the number of consecutively displayed pixels expressed in the color difference signal level of '0' in the vertical direction of the filtered digital video signal, and decide if the number of counted pixels is more than a predetermined first threshold value for a skin color area. Likewise, the horizontal projection is used to count the number of pixels, that is, the number of consecutively displayed pixels expressed in the color difference signal level of '0' in the horizontal direction of the filtered video signal, and decide if the number of counted pixels is more than a predetermined second threshold value for a skin color candidate area.

By doing so, at least one skin color candidate area having a different size can be detected from the digitized digital video signal of frame unit.

Returning to FIG. 1, the candidate area decision unit 130 normalizes the different sizes of the skin color candidate areas detected from the skin color candidate area detection unit 125c to a predetermined size. For example, the candidate area decision unit 130 can normalize all the detected skin color candidate areas to have a (20×20) pixel resolution.

Once the size of each skin color candidate area is normalized, the candidate area decision unit 130 can decide whether each normalized skin color candidate area is an image for either a human or non-human (i.e. surroundings) image. This decision can be performed by using the Mahalanobis Distance (MD) method, and a detailed description on the MD method will be omitted as the MD method is well known to those skilled in the art.

The candidate area storage unit 140 then stores position coordinate values of the skin color candidate area decided as a human image, as well as storing the digital video signal for the skin color candidate area normalized to the predetermined size by the candidate area decision unit 130.

The control unit 135 controls the overall operations of the monitoring system 100 according to control programs, such as those stored in a program storage unit (not shown) coupled with the control unit.

The control unit 135 processes the position coordinate values of the skin color candidate area and the digital video signal for the skin color candidate area normalized to the predetermined size provided by the candidate area decision unit 130 that is stored in the candidate area storage unit 140.

Based upon these processes, specifically the detection of a human image, the control unit 135 outputs to the P/T/Z drive unit 110 a zooming control signal for capturing enlarged images of only the skin color candidate area decided as a human image by the candidate area decision unit 130, and also outputs a position control signal corresponding to the position coordinate values by reading the position coordinate values of the skin color candidate area from the candidate area storage unit 140.

Thus, the image-photographing unit 105 adaptively traces the skin color candidate area and captures an enlarged image of the area. Described in more detail, the P/T/Z drive unit 110 moves the image-photographing unit 105 to a position where it can capture images of the candidate area based on the position control signal output from the control unit 135, and drives the zoom lens of the image-photographing unit 105 to zoom in over a predetermined magnification factor for capturing an enlarged image of the skin color candidate area based on the zooming control signal.

It takes a certain period of time however, for the control unit 135 to output the zooming control signal corresponding to the certain skin color candidate area. Accordingly, if a certain skin color candidate area is detected by the candidate area decision unit 130, the control unit 135 outputs a zooming control signal for establishing initial enlargements (i.e. an initial zooming control signal), resulting in reducing the response time required for the zooming operation of the image-photographing unit 105 when the zooming control signal corresponding to the certain skin color candidate area is provided.

The initial zooming control signal for establishing initial enlargements is a site-specific signal established to rapidly capture enlarged images, generally targeting an area over a certain size anticipated to include, or be very close to including the certain skin color candidate area and which can also be stored in the program storage unit. Accordingly, each skin color candidate area captured in an enlarged image by the initial zooming control signal can be different in size, but is still captured in an enlarged image that can be recognized by a user. That is, by setting up an initial zooming control signal in consideration of the place and the monitoring spots where the image-photographing unit 105 is installed, the certain skin color candidate area detected in the monitoring spots can be more rapidly captured in an enlarged image in a recognizable size.

Further, in examples in which one image-photographing unit 105 sequentially captures images of at least two monitoring spots, a different or an identical initial zooming control signal can be set up for enlarged images of each monitoring spot.

Once a zooming control signal is provided and an enlarged image captured, the enlargement analog video signal for a certain skin color candidate area captured in an enlarged image by the image-photographing unit 105 is converted into an enlargement digital video output signal by ADC 115.

The switching unit 120 then selectively provides the enlargement digital video signal output from the ADC 115 to the face detection unit 145 based on the controls of the control unit 135.

The face detection unit 145 is then used to detect a face video signal from the enlargement digital video signal output.

Specifically, the face detection unit 145 has a first face candidate area detection unit 145a, a second face candidate area detection unit 145b and a final face detection unit 145c, as shown in FIG. 3.

The first face candidate area detection unit 145a applies a specific pattern to the enlargement digital video signal converted by the ADC 115 and detects a face candidate area at which a face likely exists. In an example where an M-grid Gabor Wavelet is applied as the specific pattern, the first face candidate area detection unit 145a matches an '"M" like shape grid' with a normalized face image, then extracts (20×40) responses as feature vectors. These (20×40) responses are obtained from a convolution of 40 (5 frequency×8 orientation) Gabor filters at 20 feature points on the grid. The detection unit 145a then performs a learning procedure for calculating a maximum distance with respect to an average of 5 frequency groups in a feature vector space.

When an enlargement digital video signal of a unit frame is input, the first face candidate area detection unit 145a matches the '"M' like shape grid' with all possible positions, extracts feature vectors and performs a detection procedure for calculating a distance with respect to an average vector of the learned 5 frequency groups, respectively. If the minimum distance resulting from the distances calculated in the detection procedure with respect to the average vector is smaller than the maximum distance obtained in the learning procedure, the first face candidate area detection unit 145a decides the area including feature vectors with the minimum distance is a face candidate area.

The second face candidate area detection unit 145b uses the low-resolution support vector machine (SVM) to detect a specific candidate area including a specific portion of the face from the detected face candidate area.

Described in detail, the second face candidate area detection unit 145b performs the Principal Component Analysis (PCA) over a plurality of normalized face images, for example having (20×20) resolution in the learning procedure and uses 20 Eigen vectors to extract feature vectors in ascending order of Eigen values. Further, the second face candidate area detection unit 145b uses the above 20 Eigen vectors to extract the feature vectors from randomly collected normalized non-face images, for example as above, having (20×20) resolution. Once a plurality of face feature vectors and non-face feature vectors are extracted, the second face candidate area detection unit 145b applies the extracted feature vectors to the SVM to acquire decision boundaries by which two classes, that is, face and non-face images, can be distinguished.

The second face candidate area detection unit 145b also performs a detection step for detecting a specific candidate area of a face by checking whether the face is included in the respective observation windows in use by the decision boundaries acquired with respect to all possible observation windows of the face candidate area detected from the first face candidate area detection unit 145a.

The final face detection unit 145c then uses the high-resolution SVM about the detected specific candidate area to finally detect the face. In particular, the final face detection unit 145c detects a face in a method similar to the decision boundary acquisition and specific candidate area detection of the feature candidate area detection unit 125 as described above.

However, the final face detection unit 145c uses an image having a (40×40) pixel resolution in the learning procedure and uses 50 Eigen vectors to extract features. Further, the final face detection unit 145c then uses the high-resolution SVM about the specific candidate area, including a specific portion of the face detected from the second face candidate area detection unit 125, to finally detect the face.

A storage and retrieval unit 100a comprises the compression unit 150, the DB generation unit 155, the recording unit 160, the decompression unit 165, the DAC 170 and monitor.

The compression unit 150, based on the control of the control unit 135 connected via a bus 180, then compresses the digital video signal of each frame unit output from the candidate area detection unit 125 and a face video signal detected from the final face detection unit 145c into a predetermined compression format such as MPEG-2.

The DB generation unit 155, also based on the control of the control unit 135 connected via the bus 180, then generates a DB for the images of at least one of the digital video signals provided from the compression unit 150, an identification number of the image-photographing unit 105 producing the digital video signals, and an image-capturing time for the video signals.

Further, the DB generation unit 155 generates a DB for face video signals of the compressed face video signals provided from the compression unit 150 and at least one of an identification number and an enlarged image-capturing time of the image-photographing unit 105 producing the compressed face video signals.

The DB for the images produced, and the DB for the face video signals are both recorded on the recording unit 160 under the control of the control unit 135.

For the recording unit 160, the embodiment of the present invention shown in FIG. 1 uses a recording medium such as a hard disc drive (HDD) enabling the mass storage of records.

The decompression unit 165, based on the control of the control unit 135 connected via the bus 180, can decompress the compressed digital video signal recorded in the recording unit 160 into a predetermined format for providing an output when required.

The DAC 170 converts the digital video signal decompressed by the decompression unit 165 into an analog video signal. The converted analog video signal is then displayed on a monitor (not shown).

For use with the units described above, a key manipulation unit 175 is provided, which has a plurality of manipulation keys (not shown) for providing a signal output to the control unit for setting up or manipulating a function supported by the monitoring system 100. The key manipulation unit 175 is connected to the monitoring system 100 through a certain communication interface unit (not shown) which may be provided in the main body of the monitoring system 100.

In the embodiment of the present invention shown in FIG. 1, the example key manipulation unit 175 has a face recording key 175a for detecting and recording only human face images from a monitoring spot taken through the image-photographing unit 105, and a face searching key 175b for searching for only face video signals from diverse video signals recorded on the recording unit 160.

For example, if the face recording key 175a is selected, the control unit 135 processes the capturing of enlarged images of human face images from a monitoring spot and the recording of the enlarged human face images on the recording unit 160 as described above.

If the face searching key 175b is selected, the control unit 135 searches for face video signals only from the recording unit 160 and provides the searched face video signals as outputs to the decompression unit 165. Search conditions such as identification numbers, image-capturing times, and so forth, can be applied for rapid and smooth searches.

In particular, if a certain face video signal is selected by a key manipulation of the key manipulation unit 175 after the face searching key 175b is selected and a plurality of face video signals are reproduced on a monitor, the control unit 135 can control the recording unit 160 and the decompression unit 165 to reproduce all the digital video signals taken at a specific time, such as the same time as the time at which the selected face video signal was taken, or all digital video signals taken by the same image-photographing unit 105 which also captured the selected face video signal.

If a certain face video signal is selected by the key manipulation unit 175 and the key manipulation unit 175 outputs a command signal for reproducing entire digital video signals taken at the same time as the selected face video signal was taken (i.e. unenlarged wide-view images taken at the time during which the selected face video signal was detected as described above), the control unit 135 can read-out from the recording unit 160 information on the time at which the selected face video signal was taken (i.e. a read-out time). Further, the control unit 135 can control the recording unit 160 to output entire digital video signals taken at the same time as the read-out time. The control unit 135 can then control the decompression unit 165 to decompress entire digital video signals from the recording unit 160.

Thus, a monitor can display entire digital video signals taken during the time when the selected face video signal was taken, so that a user can conveniently search for related surrounding situations in the un-enlarged, wide-view images.

A backup unit (not shown) can also be provided in the monitoring system 100 according to an embodiment of the present invention, which enables digital video signals recorded in the recording unit 160 to be stored as backup data. A recording medium such as a digital audio tape, compact disk, and so forth, may be used for the backup unit.

FIG. 4 is a flow chart illustrating an example of a face image detection method for the monitoring system of FIG. 1.

Referring to FIG. 1 through FIG. 4, at a first step after starting, the ADC 115 converts a video signal taken at a predetermined magnification factor through the image-photographing unit 105 into a digital video signal at step S400.

If the digital video signal is provided to the candidate area detection unit 125 by the switching unit 120, the candidate area detection unit 125 compares a color difference signal level of the converted digital video signal with a reference color difference signal level range predetermined for a skin color decision and decides whether at least one skin color candidate area exists, and, if there exists such at least one skin color candidate area, detects at least one skin color candidate area at step S410.

If skin color candidate areas are detected at the step S410, the candidate area decision unit 130 normalizes each detected skin color candidate area at a predetermined pixel resolution at step S420 and decides whether each normalized skin color candidate area is an image of either human or non-human (i.e. surroundings) at step S430. The candidate area storage unit 140 then stores the position coordinate values and video signals for the normalized skin color candidate areas.

If it is decided at the step S430 that a certain skin color candidate area is a human image, the image-photographing unit 105 moves to a position where it can capture images of the skin color candidate area based on the controls of the P/T/Z drive unit 110 and captures enlarged images of the skin color candidate area, and the ADC 115 then converts the video signal for enlarged images into an enlargement digital video signal at step S440.

The switching unit 120 then provides the enlargement digital video signal to the face detection unit 145.

The face detection unit 145 decides whether a face video signal exists based on the converted enlargement digital video signal, and, if decided to exist, detects the face video signal at step S450.

If the face video signal is detected, the compression unit 150 compresses the detected video signal into a predetermined format at step S460.

If a face image is detected at the step S450, the DB generation unit 155 generates a DB of the compressed face video signal and at least one of the identification number and image-capturing time of the image-photographing unit 105 which captured the compressed face video signal, and the generated DB is recorded in the recording unit 160 at step S470.

If a skin color candidate area is not detected at the step S410, the compression unit 150 compresses the digital video signal of the frame unit which is converted at the step S400 into a predetermined format, and the recording unit 160 databases the compressed digital video signal of the frame unit for records at step S480.

In the monitoring system 100 and the face image detection method according to the embodiment of the present invention as described above, the face image detection can be carried out through various known methods such as face detection based on face shape information, feature points of a face, pattern-based approach face detection, color information, and so forth, in addition to the face detection based on the SVM presented in FIG. 3.

As described above, the monitoring system and method is capable of detecting face images. If the monitoring system detects a subject during photographing images of a monitoring spot, the system can detect, enlarge and record a subject's face image so that a user can easily search for the subject's face upon searching stored image data. Further, the present invention generates a data base when recording subject images, so that a user can efficiently search for desired image signals from a large amount of recorded video signals.

Although the preferred embodiments of the present invention have been described, it will be understood by those skilled in the art that the present invention is not limited to the described preferred embodiments, but various changes and modifications can be made within the spirit and scope of the present invention as defined by the appended claims.

What is claimed is:

1. A monitoring system to detect and record an image at a monitored position, the system comprising:
    an image-capturing photographing unit adapted to capture at least one photographic image and communicate said image as an image video signal;
    a candidate area detection and decision unit adapted to evaluate said image video signal to detect a human skin color candidate area within said image and if detected, to direct said image-capturing photographing unit to capture at least one enlarged photographic image of said human skin color candidate area and output said enlarged photographic image as an enlarged image video signal;
    a face detection unit adapted to evaluate said enlarged image video signal to detect a face video signal within said enlarged image video signal, wherein said face detection unit comprises a first face candidate area detection unit adapted to use a pattern with said enlarged image video signal to detect a face candidate area, a second face candidate area detection unit adapted to use a low-resolution support vector machine to detect a specific candidate area within said detected face candidate area, and a final face detection unit adapted to use a high-resolution support vector machine to detect the face video signal within said specific candidate area; and
    a storage and retrieval unit to receive and store said detected face video signal.

2. A monitoring system to detect and record an image at a monitored position as claimed in claim 1, wherein said candidate area detection and decision unit further comprises:
    a color difference signal calculation unit adapted to compare a color difference signal level of said video signal with a reference range and to digitize said video signal as a first or second value based upon said comparison; and
    a skin color candidate area detection unit adapted to compare at least one of said first and second values with a threshold value to detect a skin color candidate area.

3. A monitoring system to detect and record an image at a monitored position as claimed in claim 2, wherein:

said first value indicates a color difference signal level of said video signal within said reference range; and said second value indicates a color difference signal level of said video signal outside said reference range.

4. A monitoring system to detect and record an image at a monitored position as claimed in claim 2, wherein said candidate area detection and decision unit further comprises:
a decision unit adapted to normalize said skin color candidate area and to determine if said normalized skin color candidate area is a human skin color candidate area.

5. A monitoring system to detect and record an image at a monitored position as claimed in claim 1, wherein:
said first face candidate area detection unit uses an M-Grid Gabor Wavelet pattern with said enlarged image video signal to detect said face candidate area.

6. A monitoring system to detect and record an image at a monitored position as claimed in claim 1, wherein:
said second face candidate area detection unit uses a Principal Component Analysis to generate a plurality of face and non-face feature vectors for use with said support vector machine.

7. A monitoring system to detect and record an image at a monitored position as claimed in claim 1, wherein said storage and retrieval unit further comprises:
a compression/decompression unit to compress or decompress at least one of said image video signal, enlarged image video signal and detected face video signal;
a database generation unit to create a database based upon at least one of said image video signal, enlarged image video signal and detected face video signal;
a recording unit to store at least one of said image video signal, enlarged image video signal and detected face video signal; and
a monitor to display at least one of said image video signal, enlarged image video signal and detected face video signal.

8. A monitoring system for detecting and recording an image at a monitored position as claimed in claim 1, wherein said storage and retrieval unit further comprises:
a key manipulation unit to direct said capturing, storage and retrieval of at least one of said image video signal, enlarged image video signal and detected face video signal.

9. A monitoring system to detect and record an image at a monitored position as claimed in claim 1, wherein:
said photographing unit further comprises a pan, tilt and zoom mechanism for capturing said photographic image and said enlarged photographic image.

10. A monitoring system to detect and record an image at a monitored position as claimed in claim 1, further comprising a switching unit adapted to selectively switch one among said candidate area detection and decision unit and said face detection unit to provide said image video signal.

11. A monitoring system to detect and record an image at a monitored position as claimed in claim 2, further comprising a filter adapted to filter noise from said digitized video signal.

12. A monitoring system for analysis, storage and retrieval of an image, the system comprising:
an image photographing unit adapted to capture at least one of a normal and an enlarged video signal of an image;
a candidate detection unit adapted to evaluate said captured normal video signal to detect a human skin candidate area based upon a color range and control said image photographing unit to capture an enlarged video signal of said human skin candidate area;
a face detection unit adapted to evaluate said captured enlarged video signal of said human skin candidate area to detect a facial image video signal, wherein said face detection unit comprises a first face candidate area detection unit adapted to use a pattern with said enlarged video signal to detect a facial candidate area, a second face candidate area detection unit adapted to use a low-resolution support vector machine to detect a specific candidate area within said detected facial candidate area, and a final face detection unit adapted to use a high-resolution support vector machine to detect the facial image video signal within said specific candidate area; and
a storage and retrieval unit adapted to store said facial image video signal.

13. A monitoring system for analysis, storage and retrieval of an image as claimed in claim 12, further comprising:
a database of said facial image video signals having at least one unique identifier adapted to allow a user to search for a desired normal, enlarged and facial image video signal from a large amount of recorded video signals.

14. A method to detect and record an image at a monitored position, the method comprising the steps of:
converting an analog image video signal taken at a predetermined magnification factor through an image capturing unit into a digital image video signal and evaluating said digital image video signal to determine if a human skin color candidate area is detected by comparing a color difference signal level of said digital image video signal with a color reference range to determine if said human skin color candidate area is detected, and if said candidate area is detected, controlling said image capturing unit to capture an enlarged analog image video signal of said human skin color candidate area; and
converting said enlarged analog image video signal into an enlarged digital image video signal and evaluating said enlarged digital signal to determine if a face image video signal is detected by applying at least one of a pattern, low-resolution support vector machine and a high-resolution support vector machine to detect said face image video signal, and if said face image video signal is detected, recording said face image video signal.

15. A method to detect and record an image at a monitored position as claimed in claim 14, wherein said recording said face image video signal further comprises the steps of:
compressing said face image video signal and generating a face image database for said signal; and
recording said compressed face image video signal and said database.

* * * * *